Oct. 10, 1950 — L. E. TREES — 2,525,382
ADJUSTABLE CLOTHESLINE TIGHTENER
Filed Jan. 22, 1947
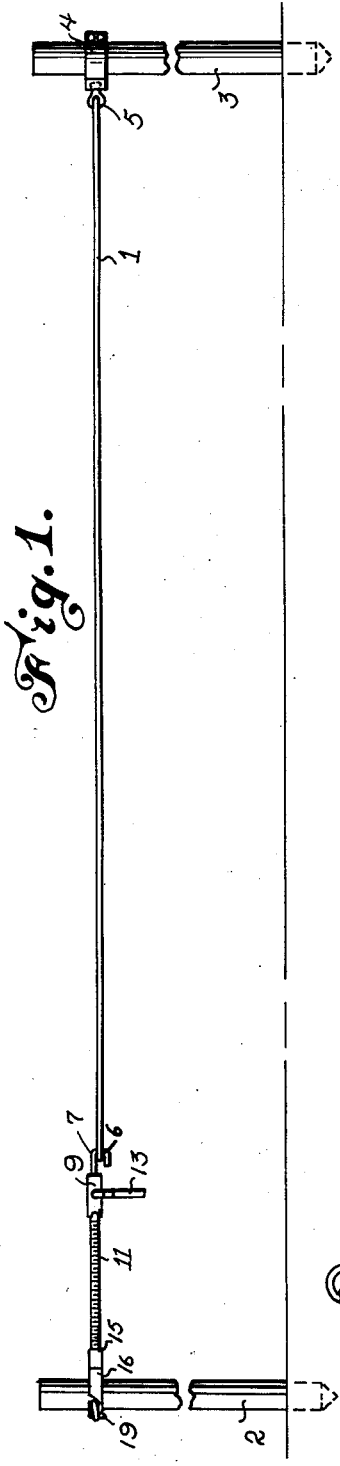
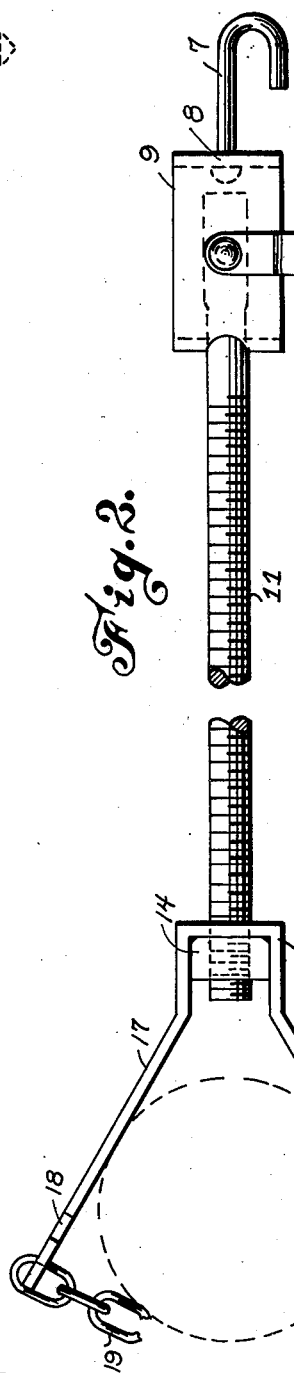
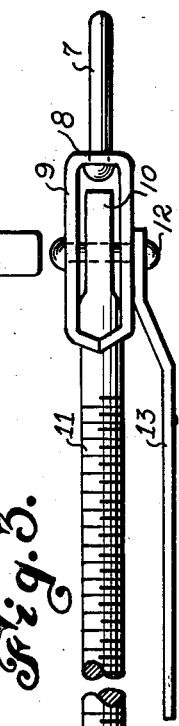
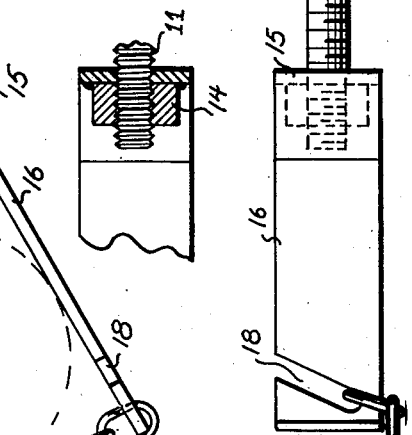
INVENTOR.
Leonard E. Trees
BY Victor J. Evans & Co.
ATTORNEYS Patented Oct. 10, 1950

2,525,382

UNITED STATES PATENT OFFICE 2,525,382

ADJUSTABLE CLOTHESLINE TIGHTENER

Leonard E. Trees, Ceylon, Minn., assignor to Behrend A. Reemtsma, Garner, Iowa

Application January 22, 1947, Serial No. 723,582

1 Claim. (Cl. 254—67)

My present invention relates generally to the broad class of isolated supports for clotheslines of the single run type, and more specifically to an improved clothesline tightener for use in suspending one end of the line to a post or other support and adjusting the line to the required tension for supporting the clothes in proper position.

The primary object of the invention is the provision of a quick detachable support and tightener that may be manufactured with facility and low cost of production from a minimum number of parts, and the parts may with convenience be assembled to provide a device that is simple in operation and easily handled for the performance of its required functions.

The invention consists in certain novel features of construction and combinations and arrangements of parts as will hereinafter be described and more specifically set forth in the appended claim.

In the accompanying drawings I have illustrated one complete example of a physical embodiment of my invention wherein the parts are combined and arranged in accord with one mode I have devised for the practical application of the principles of my invention. It will however be understood that changes and alterations are contemplated and may be made in these exemplifying drawings and mechanical structures, within the scope of my claim, without departing from the principles of my invention.

Figure 1 is a view in side elevation showing a clothesline supported between isolated posts and equipped with the line tightener of my invention.

Figure 2 is an enlarged top plan view of the adjustable tightener; and

Figure 3 is an edge view of the structure in Fig. 2.

Figure 4 is a sectional detail view through the non-rotary anchoring head for the adjusting screw bar.

In order that the utility of parts and their general arrangement may readily be understood I have shown in Fig. 1 a clothesline 1, of rope or wire as desired, which is suspended between two isolated posts 2 and 3 according to my invention, and it will be understood that other suitable supports may be substituted for the posts.

As here shown one end of the line is fastened to the post 3 by any suitable means, as for instance a clamp collar or band 4 to which the line is attached at 5, and the other end of the line is equipped with the suspending and tightening device of my invention for quick detachable fastening to the post 2.

The line 1 is provided with an attaching loop 6 that is slipped over a hook 7 which is swiveled at 8 in the end wall of a double-wall holder or rotatable operating head 9, into which the perforated end 10 of a screw bar 11 is inserted and rigidly fastened.

The rotatable head is rigidly mounted on the end of the screw bar by means of a headed rivet or bolt 12 that passes through holes in the double wall head and the end 10 of the screw bar; and a handle 13 for turning the rotatable head and screw bar is pivoted on the rivet or bolt exterior of the head or holder.

The handle may be swung on its pivot from the parallel position in Fig. 3 where it lies alongside the screw bar, to the operative position of Fig. 2 where it is extended transversely of the screw bar, and in this latter position the handle, head, and screw bar may be turned as desired, to tighten or to loosen the line, and the swivel hook remains stationary thus preventing twisting of the line.

The rotatable adjusting screw is anchored to the post 2, or other suitable support by means of a non-rotary anchoring head that includes a non-traveling nut 14 which is welded in the squared head 15, and the latter is provided with a hole alined with the threaded bore of the nut to accommodate the free end of the screw bar.

The stationary or non-rotary anchoring head, as best seen in Fig. 2 is fashioned with a pair of outwardly diverging arms 16 and 17 which terminate at their free end in hooks that are fashioned by cutting biased open end slots 18 in the arms a short distance in from the ends of these arms, which may be fashioned of somewhat resilient metal. As indicated in Fig. 2 the arms are designed to clasp the post, or other support, and by frictional engagement with the post they center or aline the tightening device with the clothesline.

The arms 16 and 17 are held under tension and clasped in straddling position on the post by means of a flexible link that connects the ends of the arms and bears against the face of the post or support at the opposite side to the anchoring head.

One example of the flexible link is provided by the utilization of the chain 19, which is attached to the arms by the links at the opposite ends of the chain. The length of the chain may be ample or adequate to adapt it to a post or support of maximum dimensions, as in Fig. 2; and it will be apparent that the length of the chain may be shortened for a smaller post by utilizing one end link and then slipping an inner link of the chain over the opposite hooked arm. In this manner the anchoring head may rigidly be clasped with its arms in frictional engagement with the post; the screw bar may be adjusted to tighten the clothesline, and the clothesline is thus provided with a substantial and reliable anchor. For removal of the clothesline, the anchoring means may readily be turned to relieve the tension on the line, and the latter, with the tightening device may with convenience be detached from the posts.

Having thus fully described my invention, what I claim as new and desire to secure by Letters Patent, is:

In a clothesline tightener comprising a U-shaped rotatable operating head, a swivel hook mounted in the bight of the head, a pivot pin carried by the head transversely thereof, a screw bar having a perforated end adapted to be positioned on said pin within said head, a handle mounted on the pin outwardly of the head for turning of the head, a non-traveling nut mounted on the screw bar, a non-rotating anchoring head fixed to the nut and apertured to receive the screw bar, a pair of outwardly diverging arms on said anchoring head, said arms having slotted free ends and a flexible anchoring link connecting the slotted free ends.

LEONARD E. TREES.

REFERENCES CITED

The following references are of record in the file of this patent:

UNITED STATES PATENTS

| Number | Name | Date |
|---|---|---|
| 546,575 | Baugh | Sept. 17, 1895 |
| 812,981 | Cunningham | Feb. 20, 1906 |
| 1,134,055 | Meiser | Mar. 30, 1915 |
| 1,547,915 | Hirn | July 28, 1925 |

FOREIGN PATENTS

| Number | Country | Date |
|---|---|---|
| 29,537 | Great Britain | Dec. 31, 1904 |
| 144,076 | Switzerland | Feb. 16, 1931 |